(12) United States Patent
Oh et al.

(10) Patent No.: US 9,313,372 B2
(45) Date of Patent: Apr. 12, 2016

(54) UNIT PIXEL AND IMAGE SENSOR COMPRISING THE UNIT PIXEL CIRCUIT

(71) Applicant: Samsung Electronics Co., Ltd., Suwon-si (KR)

(72) Inventors: Minseok Oh, Osan-si (KR); Haekyung Kong, Yongin-si (KR); Han Soo Lee, Hwaseong-si (KR); Taechan Kim, Yongin-si (KR); Jungchak Ahn, Yongin-si (KR); Moosup Lim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/288,905

(22) Filed: May 28, 2014

(65) Prior Publication Data

US 2014/0375979 A1   Dec. 25, 2014

(30) Foreign Application Priority Data

Jun. 24, 2013   (KR) ........................ 10-2013-0072469

(51) Int. Cl.
*H04N 3/14* (2006.01)
*H04N 5/3745* (2011.01)
*G01S 17/89* (2006.01)

(52) U.S. Cl.
CPC ................ *H04N 3/155* (2013.01); *G01S 17/89* (2013.01); *H04N 5/3745* (2013.01); *H04N 5/37452* (2013.01)

(58) Field of Classification Search
CPC .................. G01S 7/4816–7/487; G01S 17/89; G01S 17/00; G01C 3/08
USPC .............................................. 356/3.01–28.5
See application file for complete search history.

(56) References Cited

U.S. PATENT DOCUMENTS

| | | | |
|---|---|---|---|
| 7,655,966 B2 | 2/2010 | Adkisson et al. | |
| 7,843,029 B2 | 11/2010 | Kawahito et al. | |
| 7,948,546 B2 | 5/2011 | Tsukimura | |
| 8,077,240 B2 | 12/2011 | Ellis-Monaghan et al. | |
| 8,089,036 B2 | 1/2012 | Manabe | |
| 8,203,699 B2 | 6/2012 | Bamji et al. | |
| 2003/0076484 A1* | 4/2003 | Bamji et al. | 356/5.1 |
| 2008/0157012 A1* | 7/2008 | Tachino et al. | 250/552 |
| 2008/0231832 A1* | 9/2008 | Sawachi | 356/5.1 |
| 2009/0108176 A1 | 4/2009 | Blanquart | |
| 2009/0256060 A1 | 10/2009 | Meynants et al. | |
| 2012/0153125 A1 | 6/2012 | Oike et al. | |
| 2012/0168609 A1 | 7/2012 | Krymski | |
| 2012/0175499 A1 | 7/2012 | Meynants et al. | |

FOREIGN PATENT DOCUMENTS

KR   1020120015702   2/2012

\* cited by examiner

*Primary Examiner* — Luke Ratcliffe
(74) *Attorney, Agent, or Firm* — Myers Bigel & Sibley, P.A.

(57) ABSTRACT

An image sensor is provided which includes a plurality of unit pixels, ones of which are configured to convert an input light signal into at least four frame signals. The image sensor also includes a signal processor that is configured to measure a distance from an object based on the at least four frame signals from one of the plurality of unit pixels.

17 Claims, 5 Drawing Sheets

UNIT PIXEL AND IMAGE SENSOR COMPRISING THE UNIT PIXEL CIRCUIT

CROSS-REFERENCE TO RELATED APPLICATION

This application claims priority under 35 U.S.C. §119 to Korean Patent Application No. 10-2013-0072469 filed Jun. 24, 2013 in the Korean Intellectual Property Office, the entire contents of which are hereby incorporated herein by reference.

FIELD

The present inventive concept relates to image sensors and, more particularly, to image sensors including a distance measurement technique.

BACKGROUND

An image sensor may measure image information of an object by converting photo-charges incident from the object (or, a target object) into an electrical signal. Images sensors may include a CMOS (Complementary metal-oxide-semiconductor) image sensor, a CCD (Charge Coupled Device) image sensor, etc.

An image sensor may measure a distance based on a time taken until a pulse-shaped light signal output from a source is reflected by a target object and is returned. A Time-Of-Flight (TOF) measurement technique may be used as a distance measurement technique of the image sensor.

A rolling shutter technique may be used as an image sensor driving technique. In the rolling shutter technique, a Correlated Double Sampling (CDS) operation may be performed by a column unit. If the CDS operation is not performed, a coupling may arise between columns. The coupling may cause the image sensor to experience a Fixed Pattern Noise (FPN) according to the coupling. This FPM may cause a system operation to be unstable.

SUMMARY

According to some embodiments of the inventive concept, there is provided an image sensor. The image sensor may include a pixel array. The pixel array may include a plurality of unit pixels. Ones of the plurality of unit pixels may be configured to convert an input light signal into at least four frame signals. The image sensor may also include a signal processor that may be configured to measure a distance from an object based on the at least four frame signals from one of the plurality of unit pixels.

The at least four frame signals may be a first frame signal, a second frame signal, a third frame signal, and a fourth frame signal. A first frame may include a first time period in which one of the plurality of unit pixels alternately converts the incoming light into first and second voltage levels and a second time period in which the one of the plurality of unit pixels outputs the first and second voltage levels as the first and second frame signals. A second frame may include a third time period in which the one of the plurality of unit pixels alternately converts the incoming light into third and fourth voltage levels and a fourth time period in which the one of the plurality of unit pixels outputs the third and fourth voltage levels as the third and fourth frame signals.

The first, second, third, and fourth frame signals may correspond to an input light that is converted at a phase of 0, 180, 90, and 270 degrees, respectively, relative to an output light signal that may be reflected off the object to form the input light signal.

The distance from the object may corresponds to a time difference, td, that may correspond to the equation, $$td = \arctan\left(\frac{A1 - B1}{A2 - B2}\right),$$

where the first, second, third, and fourth frame signals are A1, B1, A2, and B2, respectively.

Ones of the plurality of unit pixels may include a photodiode that may be configured to generate an electrical signal at a light node in response to the input light signal. Ones of the plurality of unit pixels may include an output unit that may be configured to receive the electrical signal from the light node and to output first and second frame signals of the at least four frame signals to an external terminal in response to the electrical signal. Ones of the plurality of unit pixels may include a discharge unit that may be electrically connected between the light node and a power terminal and configured to discharge the electrical signal of the light node to the power terminal when the first and second frame signals are output to the external terminal.

Ones of the plurality of unit pixels may include a reset unit that may be configured to reset the electrical signal applied to the output unit.

The output unit may include a first selection unit that may be configured to output the first frame signal to the external terminal. The output unit may include a second selection unit that may be configured to output the second frame signal to the external terminal.

Ones of the plurality of unit pixels may include a first switch unit that may be electrically connected between the light node and the first selection unit and configured to transfer the electrical signal of the light node to the first selection unit. Ones of the plurality of unit pixels may include a second switch unit that may be electrically connected between the light node and the second selection unit and configured to transfer the electrical signal of the light node to the second selection unit.

The first and second switch units may be turned off responsive to the first and second selection units outputting the first and second frame signals to the external terminal.

The first selection unit may include a first photo transistor that may be configured to transfer the electrical signal of the light node to a first selection transistor in response to a first photo control signal. The first selection unit may include a first selection transistor that may be configured to receive the electrical signal transferred from the first photo transistor and to output the first frame signal in response to a selection signal.

The second selection unit may include a second photo transistor that may be configured to transfer the electrical signal of the light node to a second selection transistor in response to a second photo control signal. The second selection unit may include a second selection transistor that may be configured to receive the electrical signal transferred from the second photo transistor and to output the second frame signal in response to the selection signal.

The first and second photo transistors may be turned off responsive to the first and second frame signals being output to the external terminal.

The ones of the plurality of unit pixels may include a capacitor that may be configured to accumulate the electrical signal applied to the output unit.

A phase of the second frame signal may be opposite to a phase of the first frame signal.

The discharge unit may include a discharge transistor that may be configured to discharge an electrical signal generated at the light node in response to a discharge signal.

The pixel array may output the at least four frame signals to an external terminal based on a global shutter manner.

The pixel array may be configured to convert the incoming light signal into electrical signals, transfer the electrical signals to diffusion nodes in response to a photo control signal, and transfer the electrical signal from the diffusion nodes to an external terminal based on one or more selection signals.

When the at least four frame signals are output to an exterior, the output light signal may be disabled.

According to some embodiments of the inventive concept, there is provided an image sensor. The image sensor may include a light source unit that may be configured to generate a light signal to be reflected by an object. The image sensor may include a pixel array that may be configured to convert the light signal reflected by the object into an electrical signal, to transfer the electrical signal to a floating diffusion node in response to a photo control signal, and to output a frame signal to an external terminal in response to the electrical signal applied to the floating diffusion node. The image sensor may include a row driver that may be configured to generate the photo control signal and to apply the photo control signal to the pixel array. The pixel array may output the frame signal to the external terminal based on a global shutter manner. The row driver may interrupt the photo control signal when the frame signal is output to an exterior.

The image sensor may measure a distance from the object based on Time-Of-Flight (TOF).

The pixel array may discharge the electrical signal to an exterior responsive to the photo control signal being interrupted.

The light source unit may be turned off responsive to the frame signal being output to an exterior.

BRIEF DESCRIPTION OF THE FIGURES

The accompanying figures are included to provide a further understanding of the present inventive concept, and are incorporated in and constitute a part of this specification. The drawings illustrate some embodiments of the present inventive concept and, together with the description, serve to explain principles of the present inventive concept.

DETAILED DESCRIPTION

Embodiments will be described in detail with reference to the accompanying drawings. The inventive concept, however, may be embodied in various different forms, and should not be construed as being limited only to the illustrated embodiments set forth herein. Rather, these embodiments are provided as examples so that this disclosure will be thorough and complete and will fully convey the concept of the inventive concept to those skilled in the art. Unless otherwise noted, like reference numerals denote like elements throughout the attached drawings and written description, and thus descriptions may not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Figure 1:
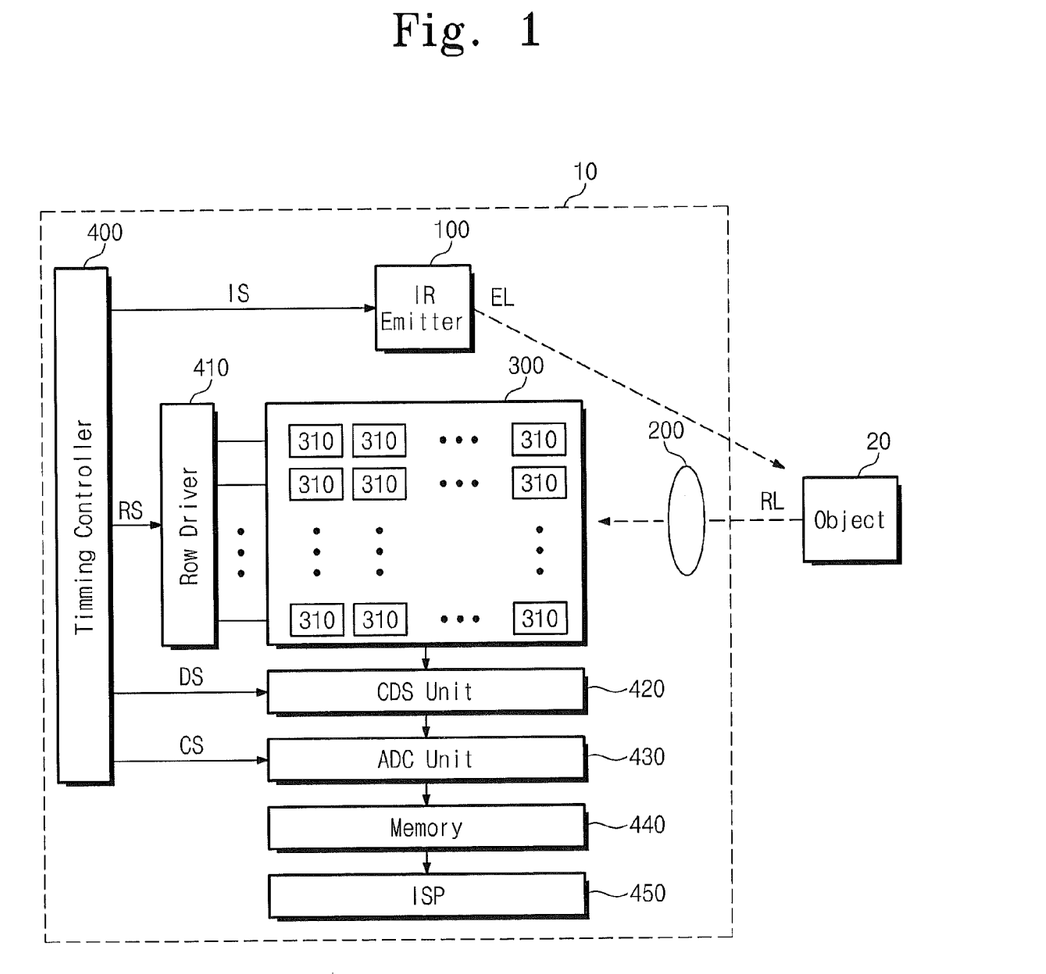
FIG. 1 is a block diagram schematically illustrating an image sensor according to some embodiments of the inventive concept.

FIG. 1 is a block diagram schematically illustrating an image sensor according to some embodiments of the inventive concept. Referring to FIG. 1, an image sensor 10 may include an infrared emitter 100, a lens 200, a pixel array 300, a timing controller 400, a row driver 410, a correlated double sampling unit 420, an analog-to-digital converter unit 430, a memory 440, and an image signal processor 450. An object 20 may be a target used to calculate a distance from the image sensor 10.

The infrared emitter 100 may generate an infrared light signal EL in response to a control signal from the timing controller 400. In some embodiments, the infrared emitter 100 may generate a modulated infrared light signal EL. The modulated infrared light signal EL may be a sine wave or a square wave.

The infrared emitter 100 may output the infrared light signal EL to the object 20. The object 20 may reflect the infrared light signal EL received from the infrared emitter 100 to the lens 200. A signal reflected by the object 20 may be a reflection light signal RL.

A distance between the image sensor 10 and the object 20 may be measured based on a time when the infrared light signal EL output from the infrared emitter 100 reaches the object 20 and a time when the reflection light signal RL reflected by the object 20 is incident onto the image sensor 10.

$$td = \frac{2d}{c} \quad (1)$$

In the equation 1, 'd' indicates a distance between the image sensor 10 and the object 20, and 'c' indicates the speed of light.

The infrared emitter 100 may be implemented by a Light Emitting Diode (LED), an Organic Light Emitting Diode (OLED), an Active-Matrix Organic Light Emitting Diode (AMOLED), or a laser diode.

The lens 20 may collect the reflection light signal RL reflected by the object 20 onto the pixel array 300.

The pixel array 300 may receive the reflection light signal transmitted through the lens 200 and a plurality of control signals provided from the row driver 410. The pixel array 300 may include a plurality of pixels 310, each of which may receive the reflection light signal and the plurality of control signals.

The pixels 310 may output a frame signal to the outside based on the reflection light signal and the plurality of control signals. The frame signal output from the pixel array 300 may be transferred to the correlated double sampling unit 420.

The timing controller 400 may control an overall operation of the image sensor 10. For example, the infrared emitter 100 may generate the modulated infrared light signal EL in response to a control signal IS output from the timing controller 400. The row driver 410 may generate a plurality of control signals needed for driving of the pixel array 300, in response to a control signal RS output from the timing controller 400.

The timing controller 400 may generate a control signal DS for an operation of the correlated double sampling unit 420 and a control signal CS for an operation of the analog-to-digital converter unit 430.

The row driver 410 may receive the control signal RS output from the timing controller 400. The row driver 410 may generate a plurality of control signals for an operation of each pixel 310 in response to the control signal RS. In some embodiments, a control signal generated by the row driver 410 may be used as a gate signal of a transistor included in the pixel 310.

The correlated double sampling unit 420 may receive the control signal DS from the timing controller 400 and the frame signal from the pixel array 300. The correlated double sampling unit 420 may perform a Correlated Double Sampling (CDS) operation on the frame signal in response to the control signal DS.

The correlated double sampling unit 420 may provide the analog-to-digital converter unit 430 with frame signals whose CDS operations are completed.

The analog-to-digital converter unit 430 may receive the control signal CS from the timing controller 400 and the frames signals whose CDS operations are completed from the correlated double sampling unit 420. The analog-to-digital converter unit 430 may perform analog-to-digital converting, in response to the control signal CS, on each frame signal whose CDS operation is completed. The analog-to-digital converter unit 430 may provide the memory 440 with digital signals obtained through the analog-to-digital converting on each frame signal.

The memory 440 may store the digital signals output from the analog-to-digital converter unit 430. The digital signals stored in the memory 440 may be output to the image signal processor 450 through a column decoder.

Figure 2:
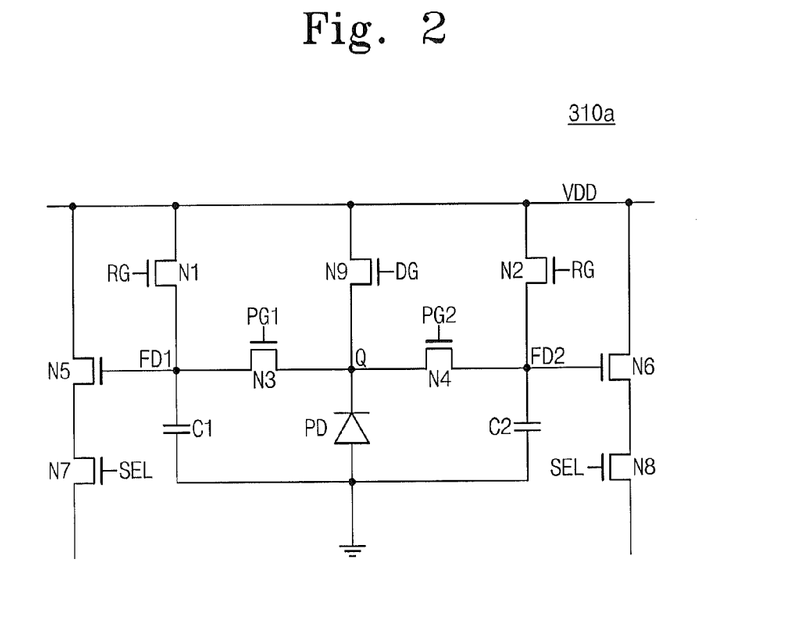
FIG. 2 is a circuit diagram schematically illustrating a unit pixel according to some embodiments of the inventive concept.

FIG. 2 is a circuit diagram schematically illustrating a unit pixel according to some embodiments of the inventive concept. Referring to FIGS. 1 and 2, a pixel 310a may include first and second reset transistors N1 and N2, first and second photo transistors N3 and N4, first and second drive transistors N5 and N6, first and second selection transistors N7 and N8, a discharge transistor N9, a first capacitor C1, a second capacitor C2, and a photodiode PD.

In some embodiments, each transistor included in the pixel 310a may be implemented by an NMOS transistor. In FIG. 2, the first and second photo transistors N3 and N4 and the first and second selection transistors N7 and N8 may act as an output unit of the unit pixel, and the first and second reset transistors N1 and N2 may act as a reset unit.

The photodiode PD may be connected between a light node Q and a ground terminal to receive a reflection light signal RL received through a lens 200. The photodiode PD may convert the reflection light signal RL into an electrical signal. The photodiode PD may transfer the electrical signal to the light node Q.

The photodiode PD may include at least one of a photo transistor, a photo gate, a pinned photo diode (hereinafter, referred to as 'PPD'), and a combination thereof.

The first reset transistor N1 may be electrically connected to a power terminal and a first floating diffusion node FD1.

The second reset transistor N2 may be electrically connected to the power terminal and a second floating diffusion node FD2.

Gate terminals of the first and second reset transistors N1 and N2 may be connected to receive a reset signal RG from a row driver 410. The first and second may reset transistors N1 and N2 reset the first and second floating diffusion nodes FD1 and FD2, respectively, in response to the reset signal RG.

The first photo transistor N3 may be electrically connected between the first floating diffusion node FD1 and the light node Q. A gate terminal of the first photo transistor N3 may be connected to receive a first photo control signal PG1 from the row driver 410. The first photo transistor N3 may transfer an electrical signal applied to the light node Q to the first floating diffusion node FD1 in response to the first photo control signal PG1. The electrical signal transferred to the first floating diffusion node FD1 may be accumulated in the first capacitor C1. In some embodiments, the electrical signal may be formed of photo-charges.

The second photo transistor N4 may be electrically connected between the second floating diffusion node FD2 and the light node Q. A gate terminal of the second photo transistor N4 may be connected to receive a second photo control signal PG2 from the row driver 410. The second photo transistor N4 may transfer an electrical signal applied to the light node Q to the second floating diffusion node FD2 in response to the second photo control signal PG2. The electrical signal transferred to the second floating diffusion node FD2 may be accumulated in the second capacitor C2.

In some embodiments, the row driver 410 controls the first and second photo may control signals PG1 and PG2 to be opposite to each other. For example, the row driver 410 may control the first and second photo control signals PG1 and PG2 to have a phase difference of 180 degrees relative to each other. Thus, when the first photo transistor N3 is turned on, the second photo transistor N4 may be turned off. On the other hand, when the first photo transistor N3 is turned off, the second photo transistor N4 may be turned on.

The first drive transistor N5 may be electrically connected between the power terminal and the first selection transistor N7. A gate terminal of the first drive transistor N5 may be connected to receive a floating voltage applied to the first floating diffusion node FD1. The first drive transistor N5 may transfer a power supply voltage VDD to the first selection transistor N7 in response to the first floating voltage.

The second drive transistor N6 may be electrically connected between the power terminal and the second selection transistor N8. A gate terminal of the second drive transistor N6 may be connected to receive a floating voltage applied to the second floating diffusion node FD2. The second drive transistor N6 may transfer the power supply voltage VDD to the second selection transistor N8 in response to the second floating voltage.

The first selection transistor N7 may be electrically connected to the first drive transistor N5 and an external terminal. The first selection transistor N7 may output a first output voltage A1 to a correlated double sampling unit 420 in response to a selection signal SEL applied from the row driver 410.

The second selection transistor N8 may be electrically connected to the second drive transistor N6 and the external terminal. The second selection transistor N8 may output a second output voltage B1 to the correlated double sampling unit 420 in response to the selection signal SEL applied from the row driver 410. Voltages output from the first and second selection transistors N7 and N8 may be frame signals.

The first and second selection transistors N7 and N8 may output third and fourth output voltages A2 and B2 based on an operation of the pixel 310a performed from a second frame. In some embodiments, in a second frame, the row driver 410 may control the phases of the first and second photo control signals PG1 and PG2 to have a phase of 90 degrees and 270 degrees, respectively, relative to the phases of the control signals of the first frame.

In the first frame, for example, the first output voltage A1 may correspond to a reflection light signal RL converted into an electrical signal when a phase of the first photo control signal PG1 is '0', and the second output voltage B1 may correspond to a reflection light signal RL converted into an electrical signal when a phase of the second photo control signal PG2 is '180' relative to the phase of the first photo control signal PG1. In the second frame, for example, the third output voltage A2 may correspond to a reflection light signal RL converted into an electrical signal when a phase of the first photo control signal of the second frame PG1 is '90' relative to the phase of the first control signal PG1 of the first frame, and the fourth output voltage B2 may correspond to a reflection light signal RL converted into an electrical signal when a phase of the second photo control signal PG2 of the second frame is '270' relative to the phase of the first control signal PG1 of the first frame.

A time difference td between the infrared light signal EL and the reflection light signal RL may be calculated based on the first, second, third and fourth output voltages A1, B1, A2, and B2.

$$td = \arctan\left(\frac{A1 - B1}{A2 - B2}\right) \quad (2)$$

If the time difference td is calculated based on the equation (2), a distance d may be calculated between an image sensor 10 and an object 20 described with reference to the equation (1).

The discharge transistor N9 may be electrically connected between the power terminal and the light node Q. The discharge transistor N9 may discharge an electrical signal applied to the light node Q to the power terminal in response to a discharge signal DG provided from the row driver 410.

In some embodiments, the discharge transistor N9 may discharge the electrical signal applied to the light node Q to the power terminal while the first, second, third and fourth output voltages A1, B1, A2, and B2 are output. A leakage current flowing to the first and second floating diffusion nodes FD1 and FD2 may be prevented by discharging the electrical signal applied to the light node Q to the power terminal. Thus, a fixed pattern noise (FPN) of a pixel circuit may be minimized.

Also, the image sensor 10 according to some embodiments of the inventive concept may operate using a global shutter technique. With the global shutter technique, the row driver 410 may simultaneously apply a control signal to pixels 310 of a pixel array 300. Thus, the pixels 310 of the pixel array 300 may simultaneously operate in response to a control signal provided from the row driver 410.

As described above, the image sensor 10 according to some embodiments of the inventive concept may measure a distance from the object based on the global shutter technique.

Figure 3:
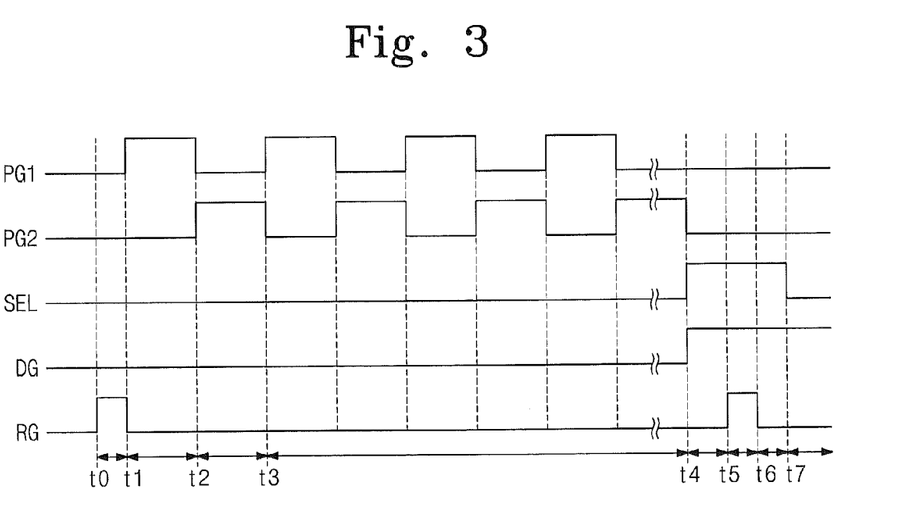
FIG. 3 is a timing diagram showing an operation of a pixel unit shown in FIG. 2, according to some embodiments of the inventive concept.

FIG. 3 is a timing diagram showing an operation of a pixel unit shown in FIG. 2 according to some embodiments of the inventive concept. Referring to FIGS. 2 and 3, at an initial time t0, a row driver 410 (refer to FIG. 1) may apply a high level of reset signal RG to gate terminals of first and second reset transistors N1 and N2.

Thus, the first and second reset transistors N1 and N2 may be turned on, so that first and second floating diffusion nodes FD1 and FD2 may be reset in response to the high level of reset signal RG.

At a first time t1, the row driver 410 may control the reset signal RG such that it transitions from a high level to a low level. At this time, the first and second reset transistors N1 and N2 may be turned off.

Also, the row driver 410 may apply a high level of first photo control signal PG1 to a gate terminal of a first photo transistor N3. The first photo transistor N3 may be turned on in response to the high level of first photo control signal PG1. Thus, an electrical signal applied to the light signal Q may be transferred to a first floating diffusion node FD1 through the first photo transistor N3.

At a second time t2, the row driver 410 may apply a low level of first photo control signal PG1 to the first photo transistor N3. The first photo transistor N3 may be turned on in response to the low level of first photo control signal PG1.

Also, the row driver 410 may apply a high level of second photo control signal PG2 to a gate terminal of a second photo transistor N4. The second photo transistor N4 may be turned on in response to the high level of second photo control signal PG2. Thus, an electrical signal applied to the light signal Q may be transferred to a second floating diffusion node FD2 through the second photo transistor N4.

As described above, the row driver 410 may control the phases of the first and second photo control signals PG1 and PG2 to be opposite to each other. Thus, the first and second photo transistors N3 and N4 may operate to be opposite to each other, in response to the first and second photo control signals PG1 and PG2.

At a third time t3, the row driver 410 may control the first and second photo control signals to iterate operations corresponding to the first and second times t1 and t2. For example, the row driver 410 may iterate operations corresponding to the first and second times t1 and t2 until voltage levels of the first and second floating diffusion nodes FD1 and FD2 reach a predetermined reference level.

At a fourth time t4, the row driver 410 may apply a high level of selection signal SEL to gate terminals of first and second selection transistors N7 and N8. Thus, the first and second selection transistors N7 and N8 may be turned on in response to the high level of selection signal SEL so that output voltages are transferred to an exterior. The output voltages may be frame signals.

In a first frame, the first selection transistor N7 may transfer an output voltage corresponding to a phase of 0 degree to the exterior, and the second selection transistor N8 may transfer an output voltage corresponding to a phase of 180 degrees to the exterior. In a second frame, the first selection transistor N7 may transfer an output voltage corresponding to a phase of 90 degrees to the exterior, and the second selection transistor N8 may transfer an output voltage corresponding to a phase of 270 degrees to the exterior.

In some embodiments, the row driver 410 may control such that a high level of selection signal SEL is sequentially applied to each row of a pixel array 300 (refer to FIG. 1). For example, the row driver 410 may apply a high level of selection signal SEL to a first row of pixels and then apply a high level of selection signal SEL to a second row of pixels. Thus, a correlated double sampling unit 420 (refer to FIG. 1) may perform a correlated double sampling operation on a frame signal every row of the pixel array 300.

In some embodiments, while the correlated double sampling unit 420 performs the correlated double sampling operation a timing controller 400 (refer to FIG. 1) may control an infrared emitter 100 to be turned off. Also, while the correlated double sampling unit 420 performs the correlated double sampling operation the row driver 410 may set first and second photo control signals PG1 and PG2 to a low level, respectively. The first and second photo transistor N3 and N4 may be turned off during a time when the first and second selection transistors N7 and N8 are turned on.

Thus, when the correlated double sampling unit 420 performs a correlated double sampling operation every row of the pixel array 300, the coupling may be reduced.

Also, when the selection signal SEL is at a high level, the row driver 410 may control a discharge signal DG to go to a high level. A discharge transistor N9 may discharge an electrical signal applied to a light node Q to a power terminal while the first and second selection transistors N7 and N8 transfer output voltages to the exterior. The discharge transistor N9 may discharge a voltage of the light node Q to the power terminal, so that a current is not leaked into the first and second floating diffusion nodes FD1 and FD2.

At a fifth time t5, the row driver 410 may control a reset signal RG to go to a high level. Thus, the first and second reset transistors N1 and N2 may be turned on such that the first and second floating diffusion nodes FD1 and FD2 are reset. The row driver 410 may control the reset signal RG so as to be generated whenever a frame is ended.

At a sixth time t6, the row driver 410 may control the reset signal RG to have a low level. As the reset signal RG transitions to a low level, the correlated double sampling unit 420 may perform a correlated double sampling operation on reset levels of the first and second floating diffusion nodes FD1 and FD2. In some embodiments, the correlated double sampling unit 420 may output a final signal sensed by the image sensor 10 by calculating the CDS-processed frame signal and the reset signal together.

At a seventh time t7, the row driver 410 may perform operations corresponding to the first to sixth times with respect to a second frame.

Figure 4:
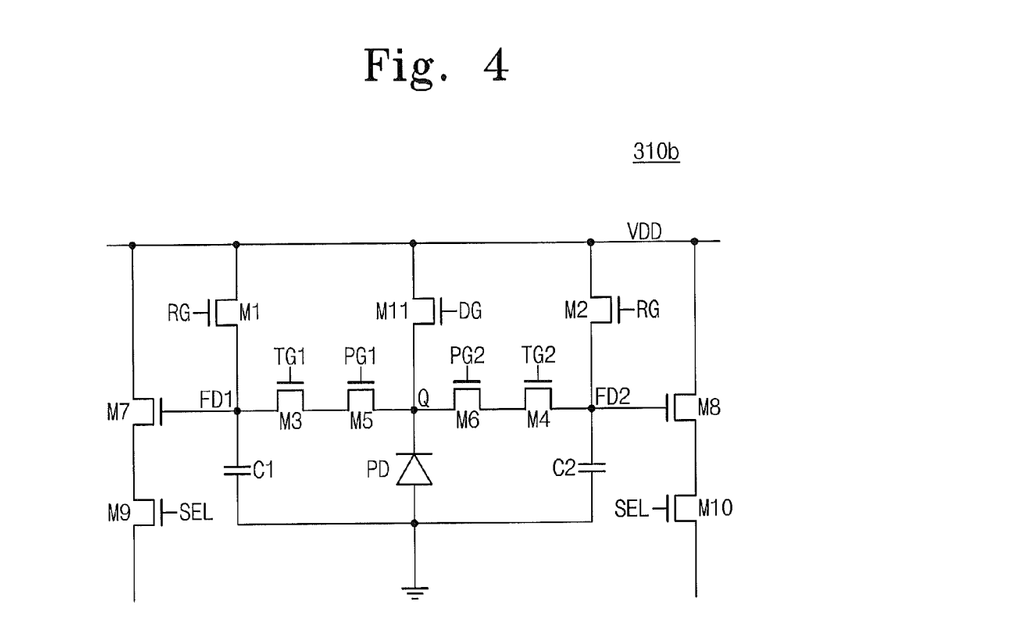
FIG. 4 is a circuit diagram showing a unit pixel according to another embodiment of the inventive concept.

FIG. 4 is a circuit diagram showing a unit pixel according to another embodiment of the inventive concept. Referring to FIGS. 1 and 4, a pixel 310b may include first and second reset transistors M1 and M2, first and second row transistors M3 and M4, first and second photo transistors M5 and M6, first and second drive transistors M7 and M8, first and second selection transistors M9 and M10, a discharge transistor M11, a first capacitor C1, a second capacitor C2, and a photodiode PD. Each transistor included in the pixel 310b may be implemented by an NMOS transistor.

The pixel 310b shown in FIG. 4 may further comprise the first and second row transistors M3 and M4 in comparison with a pixel 31a shown in FIG. 2. An operation method of the pixel 310b shown in FIG. 4 may be substantially the same as that of the pixel 310a show in FIG. 2 except for the first and second row transistors M3 and M4.

The first row transistor M3 may be electrically connected between a first floating diffusion node FD1 and the first photo transistor M5. A gate terminal of the first row transistor M3 may be connected to receive a first row signal TG1 provided from a row driver 410. The first row transistor M3 may be turned on or turned off in response to the first row signal TG1.

The second row transistor M4 may be electrically connected between a second floating diffusion node FD2 and the second photo transistor M6. A gate terminal of the second row transistor M4 may be connected to receive a second row signal TG2 provided from the row driver 410. The second row transistor M4 may be turned on or turned off in response to the second row signal TG2.

In some embodiments, the first and second row transistors M3 and M4 may be turned off while the first and second selection transistors M7 and M8 transfer output voltages to an exterior. Thus, as the first and second row transistors M3 and M4 are turned off, a leakage current flowing from a light node Q to the first and second floating diffusion nodes FD1 and FD2 may be minimized.

Figure 5:
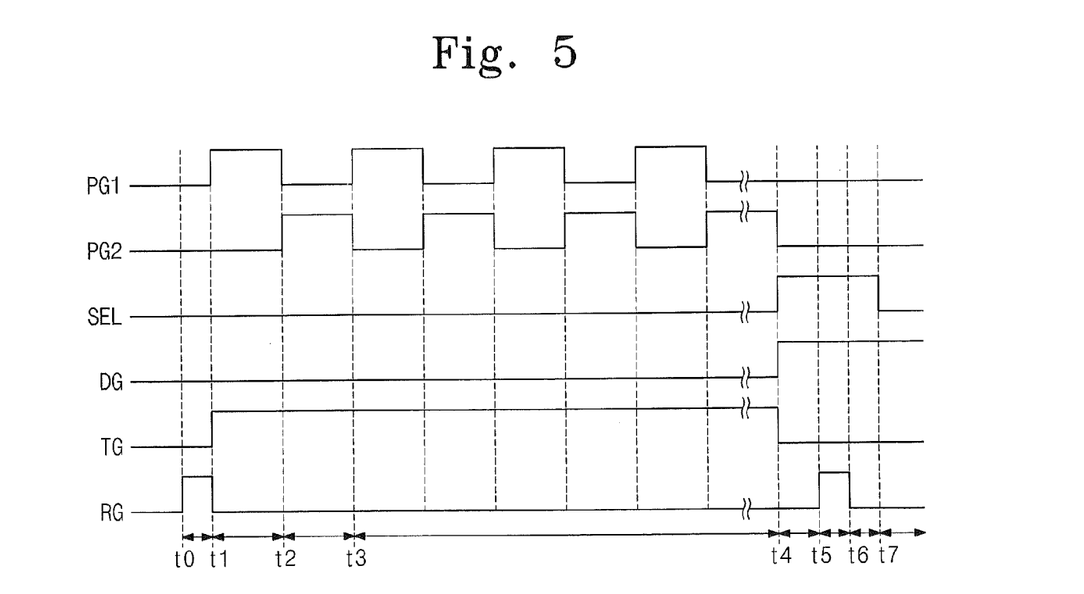
FIG. 5 is a timing diagram schematically illustrating an operation of a unit pixel shown in FIG. 4, according to some embodiments of the inventive concept.

FIG. 5 is a timing diagram schematically illustrating an operation of a unit pixel shown in FIG. 4, according to some embodiments of the inventive concept. Referring to FIGS. 4 and 5, at a first time t1, a row driver 410 (refer to FIG. 1) may apply a high level of row signal TG to gate terminals of first and second row transistors M3 and M4.

Thus, the first row transistor M3 may be turned on in response to a high level of row signal SEL, so that an electrical signal applied to a light node Q may be transferred to a first photo transistor M5. The second row transistor M4 may be turned on in response to a high level of row signal SEL, so that an electrical signal applied to the light node Q may be transferred to a second photo transistor M6.

At a fourth time t4, during a high level of the selection signal SEL, the row driver 410 may control a row signal TG to maintain a low level. Thus, the first and second row transistors M3 and M4 may be turned off, so that an electrical signal applied to the light node Q may not be transferred to the first and second floating diffusion nodes FD1 and FD2.

As described above, the first and second row transistors M3 and M4 may be turned off while output voltages are transferred from the pixel 310b to the exterior. Thus, it may be possible to minimize a leakage current transferred to a floating diffusion node.

Figure 6:
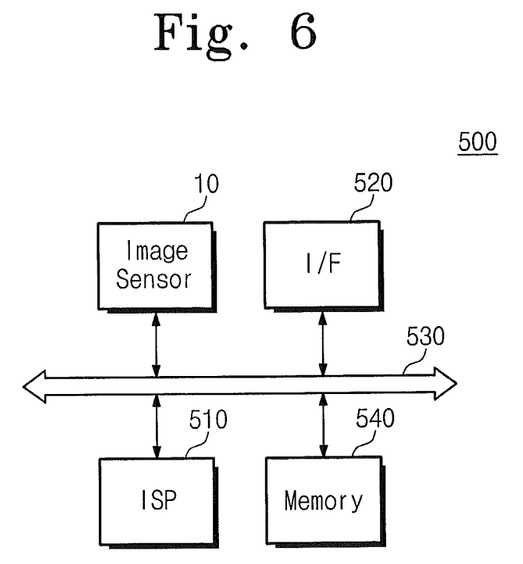
FIG. 6 is a block diagram schematically illustrating an electronic system including an image sensor, according to some embodiments of the inventive concept.

FIG. 6 is a block diagram schematically illustrating an electronic system including an image sensor, according to some embodiments of the inventive concept. Referring to FIG. 6, an electronic system 500 may include an image sensor 10, an image signal processor 510, an interface 520, a bus 530, and a memory 540.

The electronic system 500 may be implemented by a digital camera or an electronic device including the digital camera. The electronic system 500 processes two-dimensional image information or three-dimensional image information.

The electronic system 500 according to some embodiments of the inventive concept may include the image sensor 10 capable of processing three-dimensional image information. The electronic system 500 may include the image signal processor 510 for controlling an operation of the image sensor 10.

The electronic system 500 may further comprise the interface 520. The interface 520 may be implemented by an input/output device or an image display device.

The electronic system 500 may further comprise the memory 540 that may store a still image or a moving picture captured by the image sensor 10, based on an operation of the image signal processor 510. The memory 540 may be implemented by a nonvolatile memory.

In some embodiments, the nonvolatile memory may be implemented by EEPROM (Electrically Erasable Programmable Read-Only Memory), STT-MRAM (Spin-Transfer Torque MRAM), CBRAM (Conductive bridging RAM), FeRAM (Ferroelectric RAM), PRAM (Phase change RAM) called OUM (Ovonic Unified Memory), RRAM or ReRAM (Resistive RAM), nanotube RRAM, PoRAM (Polymer RAM), NFGM (Nano Floating Gate Memory), holographic memory, molecular electronics memory device, or insulator resistance change memory.

Figure 7:
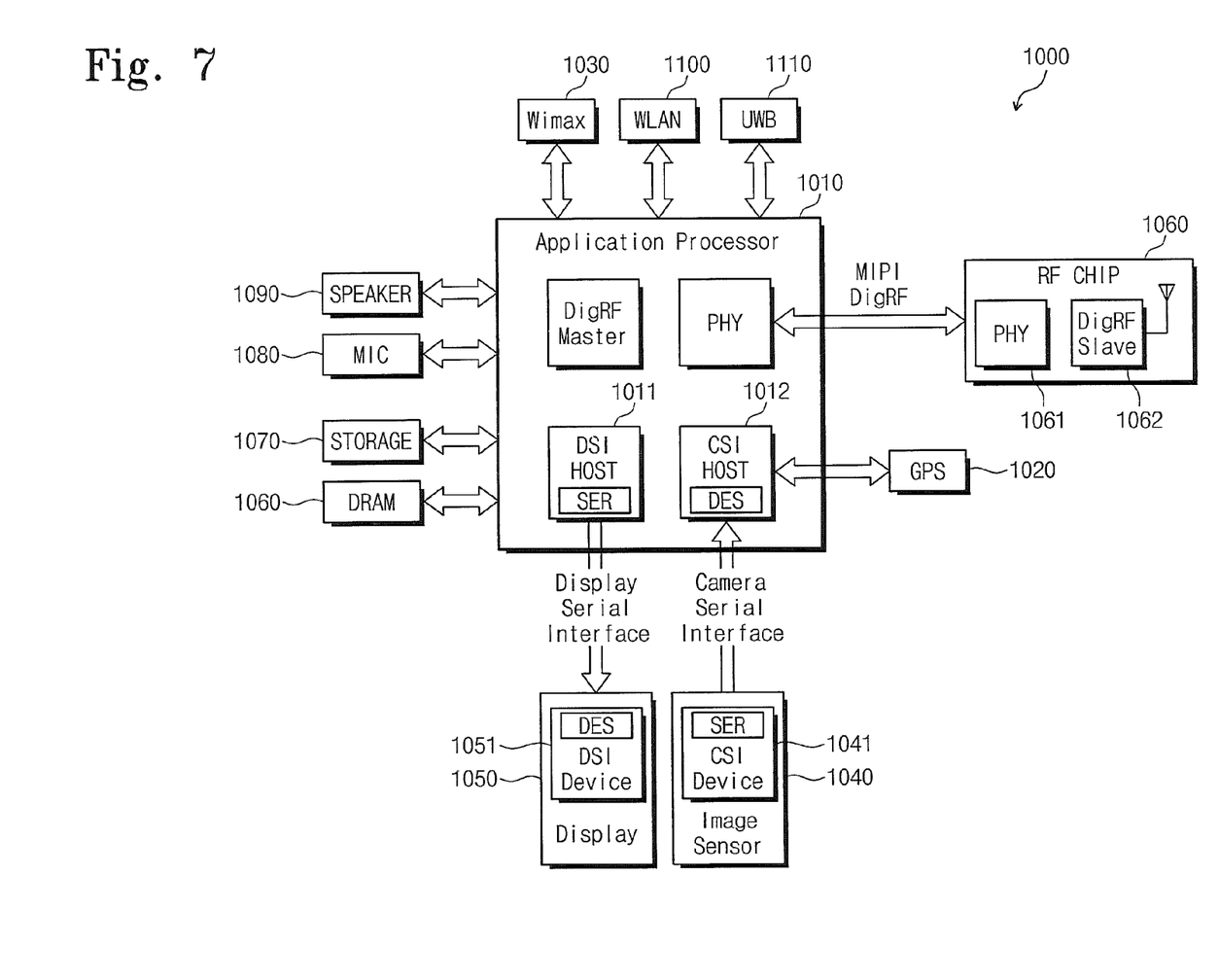
FIG. 7 is a block diagram schematically illustrating an electronic system including an image sensor according to some embodiments of the inventive concept and an interface.

FIG. 7 shows an electronic system including an image sensor according to some embodiments of the inventive concept and an interface. Referring to FIG. 7, an electronic system 1000 may be implemented by a data processing device (e.g., a cellular phone, a PDA, a PMP, or a smart phone) using or supporting an MIPI (Mobile Industry Processor Interface) interface.

The electronic system 1000 may include an application processor 1010, an image sensor 1040, and a display 1050.

A Camera Serial Interface (CSI) host 1012 of the application processor 1010 may perform serial communication with a CSI device 1041 of the image sensor 1040 through a CSI. In some embodiments, the CSI host 1012 may include an optical deserializer, and the CSI device 1041 includes an optical serializer.

A Display Serial Interface (DSI) host 1011 of the application processor 1010 may perform serial communication with a DSI device 1051 of the display 1050 through a DSI. In some embodiments, the DSI host 1011 may include an optical serializer, and the DSI device 1051 may include an optical deserializer.

The electronic device 1000 may further comprise a Radio Frequency (RF) chip 1060 capable of performing communications with the application processor 1010. PHY 1013 of the electronic device 1000 and PHY 10161 of the RF chip 1060 may perform data transmission and reception operations according to MIPI (Mobile Industry Processor Interface) DigRF.

The electronic system 1000 may further comprise a GPS 1020, storage 1070, a microphone 1080, a DRAM 1085, and a speaker 1090. The electronic system 1000 may communicate using Wimax 1030, WLAN 1100, UWB 1110, etc.

While the inventive concept has been described with reference to some embodiments, it will be apparent to those skilled in the art that various changes and modifications may be made without departing from the spirit and scope of the present invention. Therefore, it should be understood that the above embodiments are not limiting, but illustrative.

What is claimed is:

1. An image sensor, comprising:
   a pixel array comprising a plurality of unit pixels, ones of which are configured to convert an input light signal into at least four frame signals; and
   a signal processor that is configured to measure a distance from an object based on the at least four frame signals from one of the plurality of unit pixels,
   wherein ones of the plurality of unit pixels comprise,
      a photodiode that is configured to generate an electrical signal at a light node in response to the input light signal,
      an output unit that is configured to receive the electrical signal from the light node and to concurrently output first and second frame signals of the at least four frame signals to an external terminal in response to the electrical signal,
      a discharge unit that is electrically connected between the light node and a power terminal and configured to discharge the electrical signal of the light node to the power terminal when the first and second frame signals are output to the external terminal, and
      a reset unit that is configured to reset the electrical signal applied to the output unit.

2. The image sensor of claim 1,
wherein the at least four frame signals comprise a first frame signal, a second frame signal, a third frame signal, and a fourth frame signal,
wherein a first frame comprises a first time period in which one of the plurality of unit pixels alternately converts the incoming light into first and second voltage levels and a second time period in which the one of the plurality of unit pixels outputs the first and second voltage levels as the first and second frame signals, and
wherein a second frame comprises a third time period in which the one of the plurality of unit pixels alternately converts the incoming light into third and fourth voltage levels and a fourth time period in which the one of the plurality of unit pixels outputs the third and fourth voltage levels as the third and fourth frame signals.

3. The image sensor of claim 2, wherein the first, second, third, and fourth frame signals correspond to an input light that is converted at a phase of 0, 180, 90, and 270 degrees, respectively, relative to an output light signal that is reflected off the object to form the input light signal.

4. The image sensor of claim 3,
wherein the distance from the object corresponds to a time difference, td, that corresponds to the equation, $$td = \arctan\left(\frac{A1 - B1}{A2 - B2}\right),$$

and
wherein the first, second, third, and fourth frame signals are A1, B1, A2, and B2, respectively.

5. The image sensor of claim 3, wherein when the at least four frame signals are output to an exterior, the output light signal is disabled.

6. The image sensor of claim 1, wherein the output unit comprises:
a first selection unit that is configured to output the first frame signal to the external terminal; and
a second selection unit that is configured to output the second frame signal to the external terminal.

7. The image sensor of claim 6, wherein the ones of the plurality of unit pixels further comprise:
a first switch unit that is electrically connected between the light node and the first selection unit and configured to transfer the electrical signal of the light node to the first selection unit; and
a second switch unit that is electrically connected between the light node and the second selection unit and configured to transfer the electrical signal of the light node to the second selection unit.

8. The image sensor of claim 7, wherein the first and second switch units are turned off responsive to the first and second selection units outputting the first and second frame signals to the external terminal.

9. The image sensor of claim 6, wherein the first selection unit comprises:
a first photo transistor that is configured to transfer the electrical signal of the light node to a first selection transistor in response to a first photo control signal; and
the first selection transistor that is configured to receive the electrical signal transferred from the first photo transistor and to output the first frame signal in response to a selection signal.

10. The image sensor of claim 9, wherein the second selection unit comprises:
a second photo transistor that is configured to transfer the electrical signal of the light node to a second selection transistor in response to a second photo control signal; and
the second selection transistor that is configured to receive the electrical signal transferred from the second photo transistor and to output the second frame signal in response to the selection signal.

11. The image sensor of claim 10, wherein the first and second photo transistors are turned off responsive to the first and second frame signals being output to the external terminal.

12. The image sensor of claim 1, wherein the ones of the plurality of unit pixels further comprise a first capacitor that is configured to accumulate the electrical signal applied to the output unit corresponding to the first frame signal and a second capacitor that is configured to accumulate the electrical signal applied to the output unit corresponding to the second frame signal.

13. The image sensor of claim 1, wherein a phase of the second frame signal is opposite to a phase of the first frame signal.

14. The image sensor of claim 1, wherein the discharge unit comprises a discharge transistor that is configured to discharge an electrical signal generated at the light node in response to a discharge signal.

15. An image sensor, comprising:
a light source unit that is configured to generate a light signal to be reflected by an object;
a pixel array comprising a plurality of unit pixels, ones of which are configured to convert an input light signal into at least four frame signals; and
a row driver that is configured to generate a photo control signal and to apply the photo control signal to the pixel array,
wherein ones of the plurality of unit pixels comprise
a photodiode that is configured to generate an electrical signal at a light node in response to the input light signal,
an output unit that is configured to receive the electrical signal from the light node and to concurrently output first and second frame signals of the at least four frame signals to an external terminal in response to the electrical signal,
a discharge unit that is electrically connected between the light node and a power terminal and configured to discharge the electrical signal of the light node to the power terminal when the first and second frame signals are output to the external terminal, and
a reset unit that is configured to reset the electrical signal applied to the output unit.

16. The image sensor of claim 15, wherein the ones of the plurality of unit pixels further comprise:
a first photo transistor electrically connected between the photodiode and a first floating diffusion node;
a second photo transistor electrically connected between the photodiode and a second floating diffusion node;
a first drive transistor configured to transfer a voltage to a first selection transistor based on a voltage level of the first floating diffusion node; and
a second drive transistor configured to transfer a voltage to a second selection transistor based on a voltage level of the second floating diffusion node.

17. The image sensor of claim 16, wherein the row driver is further configured to:
alternately enable the first and second photo transistors in the first time period to alternately convert the incoming light into first and second floating voltage levels at the first and second floating diffusion nodes, respectively;

enable the first and second drive transistors in the second time period to output the first and second voltage levels based on the first and second floating voltage levels, respectively;

alternately enable the first and second photo transistors in the third time period to alternately convert the incoming light into third and fourth floating voltage levels at the first and second floating diffusion nodes, respectively; and enable the first and second drive transistors in the fourth time period to output the third and fourth voltage levels based on the third and fourth floating voltage levels, respectively.

* * * * *